United States Patent Office 3,050,802
Patented Aug. 28, 1962

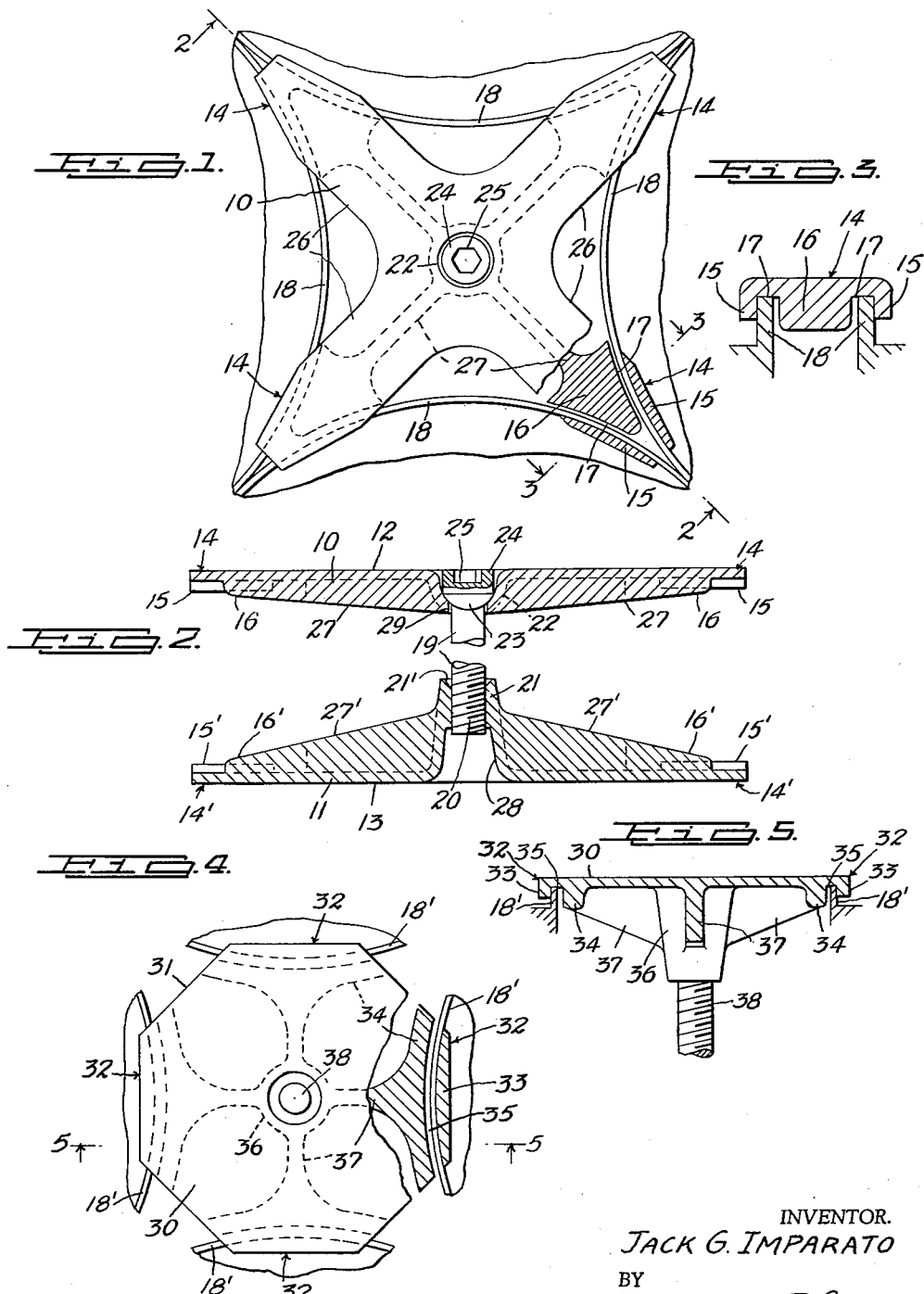

3,050,802
MULTIPLE PRODUCT COUPLING CLAMP
Jack G. Imparato, 1121 82nd St., Brooklyn, N.Y.
Filed Dec. 18, 1958, Ser. No. 781,233
3 Claims. (Cl. 24—81)

This invention relates to clamps for use in unitarily coupling three or more products such, for example, as drums or containers of any type or kind. More particularly, the invention deals with a pair of plates having circumferentially spaced clamp portions united in a central plate portion, wherein said central plate portion, or the hub thereof, is fashioned to receive and engage a coupling member, such, for example, as a bolt or screw.

Further, the invention deals with a structure of the character described, wherein the coupling member is recessed within outer exposed surfaces of the pair of plates to present flat unobstructed outer surfaces on the plates.

Still more particularly, the invention deals with a clamp of the character described, wherein the plates include radial rib portions on inner surfaces thereof and extending from the hub to the clamp portions to reinforce and strengthen the plates.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a plan view diagrammatically illustrating one of the plates in a pair in engagement with four articles, with part of the construction broken away and in section and showing only adjacent portions of the articles.

FIG. 2 is a section on the line 2—2 of FIG. 1, with parts of the construction broken away and omitting the articles illustrated in part in FIG. 1.

FIG. 3 is an enlarged section on the line 3—3 of FIG. 1, diagrammatically illustrating, in section, portions of two articles.

FIG. 4 is a view, similar to FIG. 1, showing the opposed plate of a pair and illustrating a modification; and FIG. 5 is a section on the line 5—5 of FIG. 4, omitting background showing.

With structures of the type and kind under consideration, it has been customary to employ a pair of clamp plates for engagement with two adjacent articles in coupling said articles together and illustration of one such adaptation and use can be found in my prior application Serial Number 751,071, filed July 25, 1958, issued in Patent Number 2,930,091, dated March 29, 1960.

With clamps as disclosed in said prior application, it is essential to utilize two or more of the clamps in coupling a plurality of adjacent articles. The purpose of by present invention is to provide a single pair of clamp plates coupled together by a single screw or bolt, each of the clamp plates having circumferentially spaced clamp portions for engagement with a plurality of articles in collectively uniting or securing said articles together.

Further, my invention deals with a structure of this type and kind wherein each of the clamp portions includes at least a pair of article engaging members or elements positively retaining adjacent articles against relative movement one with respect to the other, said members or elements in the construction shown being in the form of projecting flanges at opposed sides of said clamp portions.

In FIGS. 1 to 3, inclusive, I have illustrated one adaptation of my invention employing two generally similar clamp plates which, for purposes of description, can be regarded as a top plate 10 and a bottom plate 11. Each of the plates has a flat outer exposed surface, as at 12 and 13, respectively, note FIG. 2, and the plates have circumferentially spaced clamp portions, the clamp portions of the plate 10 being illustrated in detail at 14 in FIGS. 1 and 3 of the drawing. However, two of the similar clamp portions of the plate 11 are indicated in section at 14' in FIG. 2 of the drawing.

Each clamp portion 14 is provided with article engaging members or elements which, in the construction shown, are in the form of side flanges 15, shown in section on one of the clamp portions in FIG. 1 of the drawing, and in cross-section in FIG. 3 of the drawing.

Within the clamp portions 14 are webs 16, generally of the plan cross-sectional form noted in FIG. 1 and shown in cross-section in FIG. 3. The webs form, in the wider portions of the clamp portions 14, channels, as clearly noted at 17 in FIG. 3 of the drawing, in which rimmed or other edge portions 18 of adjacent articles are adapted to be positioned.

In illustrating one adaptation of the invention, I have shown in FIG. 1, as well as in FIG. 4 of the drawing, clamp devices for engaging four closely adjacent articles, which might be drums or the like, and 18, 18' represent the end rims of said drums, it being understood that the opposed end of the articles or drums have similar flanges which are disposed within the members, elements or flanges 15' of the bottom plate 11. In FIG. 2, I have also indicated at 16' webs, generally similar to the webs 16.

It will be noted, from a consideration of FIG. 3 of the drawing, that the channels 17 are made sufficiently wide to clearly and freely receive the rims 18, so that, in assemblage of the articles, the plate 11 is arranged upon a surface and adjacent rim portions of the four articles are positioned within the channels of the lower plate 11; whereupon, the upper plate 10 is arranged upon said articles with the rims 18 positioned within the channels 17; whereupon, the screw or bolt 19, or the threaded end 20 thereof, is coupled with the internally threaded raised hub portion 21 in securing the plates 10 and 11 in firm engagement with the four articles or drums.

The plate 10 includes a downwardly curved socket hub portion 22, in conjunction with which the rounded lower end 23 of the head 24 of the screw or other coupling member 19 operates in drawing the plates 10 and 11 together. The head 24 has a hexagon key socket 25, with which a suitable wrench or tool is coupled in rotating the member 19 in coupling or uncoupling the plates 10 and 11.

Considering FIG. 1 of the drawing, it will appear that the plates 10 and 11 include what might be termed radially extending arm portions 26, at the terminal ends of which are disposed the clamp portions 14 and arranged on inner surfaces of the plates and the arms 26 are radial ribs, integrally joining the hub portons with the webs 16, 16', the ribs of the plate 10 being illustrated at 27 in FIG. 1, and a section through two similar ribs of the plate 11 is indicated at 27' in FIG. 2 of the drawing.

The ribs 27, 27' will reinforce the clamp portions 14, 14', as will be apparent.

It will appear, from a consideration of FIG. 2 of the drawing, that the threaded hub 21 is raised considerably from the lower surface 13 of the plate 11 to form a deep recess 28 in said surface of the plate to allow for coupling engagement with articles, wherein the rims or other portions are differently spaced, it being understood, however, that, with drastic dimensions in spacing of the article ends or rims, coupling members 19 of different lengths will be employed.

It will appear that the hub portion 22 of the plate 10 includes an aperture 29 sufficiently large in diameter to permit rocking movement of the plate 10, so as to establish coupling engagement with articles where the spacing of the rim ends 18 may vary to slight degrees. In other words, the plate 10, or the surface 12 thereof, may assume an angular position with respect to the surface 13 of the plate 11 when the clamp is assembled on the four articles.

In Figs. 4 and 5 of the drawing, I have shown a slight modification of the structure shown in FIGS. 1 to 3, wherein two generally similar clamp plates are employed. However, in FIGS. 4 and 5 of the drawing, the bottom plate only has been illustrated in order to simplify the showing and this plate is identified by the reference character 30. The plate 30 is generally rectangular in form, but has its corners cut-away, as indicated at 31, so as to define four clamp portions 32 adapted to engage four articles, generally similar to the articles of FIG. 1 of the drawing, and including end rims 18', similar to the rims 18.

It will appear from FIG. 4, that the clamp portions 32 engage the closely adjacent portions of the four articles rather than the engagement of the clamps near where the adjacent articles abut, as, for example, the positioning of the clamp portions 14.

It will be understood that both clamp plates of the structure shown in FIGS. 4 and 5 will be generally identical and each clamp portion 32 having at least one article engaging member or element, as, for example, the flange 33, noted in section at the right of FIG. 4, and also illustrated in cross-section in FIG. 5 of the drawing.

Each clamp portion, adjacent the flange 33, includes a large curved web 34, between which and the flange 33 is a channel 35, generally similar to the channels 17 of the structure shown in FIGS. 1 to 3, inclusive. Here again, the channels 35 are sufficiently wide to freely receive the rim ends 18' in positioning the articles upon the plate 30.

The plate 30 has, centrally thereof, an internally threaded hub portion 36, identical with the hub portion 21 and this hub portion joins the webs 34 in radial ribs 37, the latter serving the same purposes as the ribs 27 of FIGS. 1 and 2 of the drawing.

At 38 is shown the lower threaded end of a coupling member, such as a screw or bolt, which serves to draw the plate 30 toward the companion plate of the clamp or, in other words, the top plate, the same as with the structure clearly illustrated in FIG. 2 of the drawing, the top plate of the clamp structure shown in FIGS. 4 and 5 including a hub portion, similar to the hub portion 22 of the plate 10, and, for this reason, no duplicate showing of the upper plate employed with the clamps, illustrated in FIGS. 4 and 5, is deemed to be necessary.

Considering FIG. 2 of the drawing, it will appear that the upper end of the hub portion 21 terminates in a bevelled or flared throat 21', which facilitates guidance of the coupling member 19 into the hub portion 21, bearing in mind that, in actual use, two plates 10 and 11 are widely spaced one with respect to the other in engaging certain types and kinds of articles and, particularly, drums which are relatively deep in construction.

To facilitate handling and shipment, the coupling member 19 is normally detached from the plate 11 and 38 will be detached from the plate 30. However, short coupling members can be employed to simply secure the pair of plates together to maintain the assemblage in the shipment and handling thereof and this can preferably be accomplished with the flat outer exposed surfaces of the plates arranged in abutting engagement. No attempt is made to show this coupling, but it will be quite apparent to those skilled in the art.

It will be understood that clamps of the type and kind can be utilized for securing or binding together any number of articles, so as to facilitate handling and shipment of the articles bound together by the clamp employed. The present illustration of joining four articles is simply by way of illustrating one adaptation and use of my invention.

Having fully described my invention, what I claim as new and desire to secure by Letters Patent is:

1. A clamp of the character described comprising a pair of plates, each plate having an inwardly offset hub portion and circumferentially arranged clamp portions spaced with respect to said hub portion, one hub portion comprising a curved socket, the other hub portion having a threaded bore, each clamp portion having at its end integral article engaging means, means extending centrally from each clamp portion to and integrally joining the offset hub portion for reinforcing each of the plates, a screw for drawing the plates together in securely coupling a plurality of articles engaged by the means on the clamp portion of each of said plates, the screw having a rounded head seating in said curved socket, said screw being threaded to engage the threaded hub portion, the outer exposed surfaces of both of said plates being generally flat, each article engaging means comprising a curved flange, and means including said curved flange forming a curved channel portion.

2. A clamp of the character described comprising a pair of plates, each plate having an inwardly offset hub portion and circumferentially arrange clamp portions spaced with respect to said hub portion, one hub portion comprising a curved socket, the other hub portion having a threaded bore, each clamp portion having at its end integral article engaging means, means extending centrally from each clamp portion to and integrally joining the offset hub portion for reinforcing each of the plates, a screw for drawing the plates together in securely coupling a plurality of articles engaged by the means of the clamp portion of each of said plates, the screw having a rounded head seating in said curved socket, said screw being threaded to engage the threaded hub portion, the outer exposed surfaces of both of said plates being generally flat, and each article engaging means of each clamp portion including a pair of curved article engaging elements.

3. A clamp of the class described comprising a pair of plates, each plate having an inwardly offset hub portion and circumferentially spaced clamp portions extending radially with respect to said hub portion, one hub portion comprising a curved socket, the other hub portion having a threaded bore, each clamp portion having on its inner surface and widely spaced from said hub portion an integral article receiving curved channel, the longitudinal path of the curved channel of each clamp portion being at an angle to radial lines extending from the axis of said hub portion through the clamp portion, means centrally on the inner surface of each plate extending radially from the channel to the hub portion for reinforcing the clamp portions of each plate, a coupling member engaging the hub portions of both plates in drawing said plates toward each other in coupling a plurality of articles together within and between said plates, said coupling member having a rounded head seating in said curved socket, said member having a threaded end engaging said threaded hub portion, and the outer surfaces of both of said plates being generally flat.

(References on following page)

References Cited in the file of this patent

UNITED STATES PATENTS

| | | |
|---|---|---|
| 193,479 | Burgin | July 24, 1877 |
| 670,870 | Drozeski | Mar. 26, 1901 |
| 910,938 | Miller | Jan. 26, 1909 |
| 1,477,818 | Gerlat | Dec. 18, 1923 |
| 1,855,909 | Fisher | Apr. 26, 1932 |
| 2,109,233 | Jorgenson | Feb. 22, 1938 |
| 2,384,112 | Meyer | Sept. 9, 1945 |
| 2,566,804 | La Flamme et al. | Sept. 4, 1951 |
| 2,592,791 | Coberly | Apr. 15, 1952 |
| 2,650,805 | Schaefer | Sept. 1, 1953 |
| 2,702,641 | Arthur | Feb. 22, 1955 |
| 2,806,273 | Ruth | Sept. 17, 1957 |
| 2,838,818 | Brennan | June 17, 1958 |

FOREIGN PATENTS

| | | |
|---|---|---|
| 715,432 | France | Sept. 28, 1931 |
| 768,214 | France | May 14, 1934 |